(12) United States Patent
Konda

(10) Patent No.: US 6,172,784 B1
(45) Date of Patent: Jan. 9, 2001

(54) IMAGE READING APPARATUS

(75) Inventor: Kazuyuki Konda, Kawasaki (JP)

(73) Assignee: Canon Kabushiki Kaisha, Tokyo (JP)

(*) Notice: Under 35 U.S.C. 154(b), the term of this patent shall be extended for 0 days.

(21) Appl. No.: 09/361,813

(22) Filed: Jul. 27, 1999

(30) Foreign Application Priority Data

Jul. 29, 1998 (JP) ................................................. 10-228649

(51) Int. Cl.⁷ .................................................. G02B 26/08
(52) U.S. Cl. .............................. 359/196; 355/57; 355/60; 355/66; 355/67; 355/71
(58) Field of Search .............................. 359/196; 355/57, 355/60, 66, 67, 71

(56) References Cited

U.S. PATENT DOCUMENTS

| | | | |
|---|---|---|---|
| 4,870,294 | * 9/1989 | Hasegawa | 355/57 |
| 4,991,030 | 2/1991 | Sato et al. | 358/474 |
| 5,606,450 | * 2/1997 | Chen | 359/196 |

FOREIGN PATENT DOCUMENTS

| | | |
|---|---|---|
| 62-217872 | 9/1988 | (JP) . |
| 9-69915 | 3/1997 | (JP) . |

* cited by examiner

Primary Examiner—Darren Schuberg
(74) Attorney, Agent, or Firm—Fitzpatrick, Cella, Harper & Scinto

(57) ABSTRACT

An image reading apparatus includes a light source for illuminating an original, a plurality of mirrors for reflecting a light beam from the original illuminated with the light source, an imaging lens for forming an image of the light beam reflected by the plurality of mirrors, an image sensor arranged at an image forming position of the imaging lens, and an integrated scanning optical unit movable in a scanning direction. The integrated scanning optical unit integrally accommodate the light source, the plurality of mirrors, the imaging lens, and the image sensor to thereby obtain image information of the original. An optical axis L connecting, of the plurality of mirrors, a mirror B optically closest to an incident surface of the imaging lens, the imaging lens, and the image sensor is substantially parallel to the original surface. The mirror B, the imaging lens, and the image sensor are located at a lowest position of the integrated scanning optical system unit with respect to the original surface. Of the plurality of mirrors, a mirror A optically closest to the original surface is disposed in a space between the optical axis L and the original surface and between the incident surface of the imaging lens and the image sensor.

11 Claims, 5 Drawing Sheets

IMAGE READING APPARATUS

BACKGROUND OF THE INVENTION

1. Field of the Invention

The present invention relates to an image reading apparatus and, more particularly, to an image reading apparatus suitable for an apparatus such as a flatbed image scanner or digital copying machine, which reads the image information of an original using an integrated scanning optical system unit in which a light source, a plurality of mirrors, imaging lens, image sensor, and the like are integrally accommodated.

2. Related Background Art

Conventionally, various image reading apparatuses such as flatbed image scanners or digital copying machines have been proposed.

FIG. 1 is a view schematically showing the arrangement of the main part of a conventional image reading apparatus of this type. Referring to FIG. 1, an original 103 placed on an original glass table 104 is illuminated with direct light from a light source 106 and a light beam that has passed through a reflector 107 from both sides. The image of the light beam reflected by the original 103 is formed on an image sensor 114 such as a CCD by an imaging lens 113 through a first mirror 108, second mirror 109, and third mirror 110 for scanning, and is converted into an electrical signal in accordance with a level light and shade (density) of the original 103. With this operation, image information of one line in the main scanning direction (direction perpendicular to the drawing sheet of FIG. 1) is read. Image reading in the sub-scanning direction (direction indicated by an arrow C in FIG. 1) is done in the following way. The first mirror table formed from the light source 106, reflector 107, and first mirror 108 is moved relative to the original 103 in the sub-scanning direction, and the second mirror table formed from the second mirror 109 and third mirror 110 is moved in the same direction at a speed ½ that of the first mirror table. With this operation, the image information of the original is read while maintaining a constant optical path length between the original 103 and image sensor 114.

The scanning optical system of this type is called a so-called 1:2 scanning optical system as a known technique. Even when the optical path length between the original and image sensor is increased, the apparatus size in the sub-scanning direction can be reduced.

However, since an original must be scanned while changing the relative positional relationship between the reading section comprising the imaging lens and image sensor that are fixed with respect to the original and the three scanning mirrors, color registration misalignment, density level variation, and defocus may occur due to vibration, angle error, and surface precision error of the scanning mirrors. To prevent this, the component precision or driving accuracy of the scanning mirrors must be increased.

FIGS. 2 and 3 are views schematically showing the arrangements of the main part of image reading apparatuses having an integrated scanning optical system unit, which relax the problem of the above 1:2 scanning optical system. Each of the integrated scanning optical system units shown in FIGS. 2 and 3 integrally accommodates components including a light source, reflector, a plurality of scanning mirrors, imaging lens, and image sensor, so an original is scanned without changing the relative positional relationship between the components.

FIG. 2 is a view schematically showing the arrangement of the main part of an image reading apparatus having an integrated scanning optical system unit disclosed in, e.g., Japanese Patent Application Laid-Open No. 63-217872. An integrated scanning optical system unit 118 shown in FIG. 2 integrally accommodates a light source 106 and reflector 107 for illuminating an original 103 placed on an original glass table 104, image sensor 114 for reading a light beam from the original 103 illuminated with the light source 106 and reflector 107, a plurality of scanning mirrors 115, 116, and 117 for guiding the light beam from the original 103, and imaging lens 113 for forming the image of the light beam from the original 103, which is based on image information, on the image sensor 114.

Referring to FIG. 2, the plurality of scanning mirrors comprise the first mirror 115, second mirror 116, and third mirror 117. A light beam from the original 103 travels from the first mirror 115 to the second mirror 116 and then from the second mirror 116 to the third mirror 117. The light beam from the third mirror 117 strikes the second mirror 116 again. After this, the light beam passes between the first mirror 115 and third mirror 117 and enters the imaging lens 113 to form its image on the image sensor 114. A plane connecting the second mirror 116, imaging lens 113, and image sensor 114 is substantially parallel to the original surface.

FIG. 3 is a view schematically showing the arrangement of the main part of an image reading apparatus having an integrated scanning optical system unit disclosed in, e.g., Japanese Patent Application Laid-Open No. 9-69915. An integrated scanning optical system unit 122 shown in FIG. 3 integrally accommodates a light source 106 and reflector 107 for illuminating an original 103 placed on an original glass table 104, image sensor 114 for reading a light beam from the original illuminated with the light source 106 and reflector 107, a plurality of scanning mirrors 119, 120, and 121 for guiding the light beam from the original 103, and imaging lens 113 for forming the image of the light beam from the original 103, which is based on image information, on the image sensor 114.

Referring to FIG. 3, illumination light by the light source 106 and reflector 107 illuminates the lower surface of the original 103 and is diffused and reflected. Some components of the light beam travel downward in the vertical direction in FIG. 3, are reflected by the first mirror 119, and reach the second mirror 120. The light beam incident on the second mirror 120 is reflected at a predetermined angle and strikes the first mirror 119 again. The light beam incident on the first mirror 119 again is further reflected at a predetermined angle. The light beam is reflected by the third mirror 121 in the horizontal direction and is incident on the imaging lens 113. A reduced image of the original 103 is formed on the image sensor 114 through the imaging lens 113, thereby reading the image information of the original 103.

These conventional image reading apparatuses have various problems to be described below.

In Japanese Patent Application Laid-Open No. 63-217872 shown in FIG. 2, the optical path from the original 103 to the first mirror 115 and that from the second mirror 116 to the imaging lens 113 cross each other, and additionally, the light beam is reflected by the second mirror 116 twice. For this reason, a space is required between the second mirror 116 and imaging lens 113, and consequently, the distance from the second mirror 116 to the image sensor 114 increases, resulting in a bulky integrated scanning optical system unit 118. Accordingly, the image reading apparatus using the integrated scanning optical system unit also becomes bulky.

In addition, the light beam from the second mirror 116 passes between the first mirror 115 and third mirror 117 and enters the imaging lens 113. With this arrangement, light components other than those contributing to image formation may be irregularly reflected by the edge portion of the first mirror 115 or third mirror 117 and enter the imaging lens as hazardous light. This generates ghost or flare to degrade the read image.

In Japanese Patent Application Laid-Open No. 9-69915 shown in FIG. 3, the third mirror 121, imaging lens 113, and image sensor 114 are parallel to the original surface and disposed immediately under the original glass table 104. The light source 106 and imaging lens 113 must therefore be arranged close to each other. In this arrangement, the light beam emitted from the light source 106 may directly enter the imaging lens 113, resulting in ghost or flare and degrading the read image.

In addition, since the optical path from the original 103 to the first mirror 119 and that from the third mirror 121 to the imaging lens 113 cross each other, a space is required between the third mirror 121 and imaging lens 113. Consequently, the distance from the third mirror 121 to the image sensor 114 increases, resulting in a bulky integrated scanning optical system unit 122. Accordingly, the image reading apparatus using the integrated scanning optical system unit also becomes bulky.

Furthermore, a read position 123 is located on the left end side of the integrated scanning optical system unit 122 with respect to a sub-scanning-direction width D of the integrated scanning optical system unit 122. For this reason, when the original 103 is scanned from the left end to the right end, a more space is necessary outside the read region at the right end, resulting in an image reading apparatus with an unbalanced arrangement.

Also, since mirrors having almost the same size as the original size in the main scanning direction are inserted on the lower side of the integrated scanning optical system unit, a space having the same size as that shown in the sectional view of FIG. 3 is required at any position in the main scanning direction. As a result, the space on both sides of the imaging lens in the main scanning direction cannot be effectively used.

SUMMARY OF THE INVENTION

It is an object of the present invention to provide an image reading apparatus having an integrated scanning optical system unit, which can suppress hazardous light such as ghost or flare and reduce the size of the integrated scanning optical system unit by appropriately setting the layout of components of the integrated scanning optical system unit.

According to the present invention, there is provided an image reading apparatus in which an integrated scanning optical system unit is adapted to move in a scanning direction, the integrated scanning optical system unit integrally accommodating light source means for illuminating an original, a plurality of mirrors for reflecting a light beam from the original illuminated with the light source means, an imaging lens for forming an image of the light beam reflected by the plurality of mirrors, and reading means arranged at an image forming position of the imaging lens, thereby reading image information of the original, wherein an optical axis L connecting, of the plurality of mirrors, a mirror B optically closest to an incident surface of the imaging lens, the imaging lens, and the reading means is substantially parallel to the original surface, the mirror B, the imaging lens, and the reading means are located at a lowest position of the integrated scanning optical system unit with respect to the original surface, and of the plurality of mirrors, a mirror A optically closest to the original surface is disposed in a space between the optical axis L and the original surface and between the incident surface of the imaging lens and the reading means.

Especially, the image reading apparatus of the present invention is characterized in that the mirror A is disposed substantially at a middle position between the mirror B and the reading means, an on-axis light beam of the mirror B is incident on the mirror B substantially at 45°, and a light beam regulation slit is disposed on a light beam incidence side of the mirror B, and the light beam regulation slit has a shading correction function;

the plurality of mirrors comprise first, second, third, fourth, and fifth mirrors and have an arrangement with which the light beam from the original is reflected by the first mirror and strikes the second mirror, the light beam reflected by the second mirror passes across an optical path between the original and the first mirror and strikes the third mirror, the light beam reflected by the third mirror passes across the optical path between the original and the first mirror again and strikes the fourth mirror, the light beam reflected by the fourth mirror passes across an optical path between the first mirror and the second mirror and strikes the fifth mirror, and the light beam reflected by the fifth mirror enters the imaging lens, the first mirror is disposed substantially at a middle position between the fifth mirror and the reading means, a light beam on an axis of the fifth mirror is incident on the fifth mirror substantially at 45°, and a light beam regulation slit is disposed on a light beam incidence side of the fifth mirror, and the light beam regulation slit has a shading correction function;

the plurality of mirrors comprise first, second, third, and fourth mirrors and have an arrangement with which the light beam from the original is reflected by the first mirror and strikes the second mirror, the light beam reflected by the second mirror passes across an optical path between the original and the first mirror and strikes the third mirror, the light beam reflected by the third mirror strikes the fourth mirror, and the light beam reflected by the fourth mirror enters the imaging lens, the first mirror is disposed substantially at a middle position between the fourth mirror and the reading means, an on-axis light beam of the fourth mirror is incident on the fourth mirror substantially at 45°, and a light beam regulation slit is disposed on a light beam incidence side of the fourth mirror, and the light beam regulation slit has a shading correction function; or the plurality of mirrors comprise first, second, third, and fourth mirrors and have an arrangement with which the light beam from the original is reflected by the first mirror and strikes the second mirror, the light beam reflected by the second mirror strikes the third mirror, the light beam reflected by the third mirror passes across an optical path between the original and the first mirror and strikes the fourth mirror, the light beam reflected by the fourth mirror passes across the optical path between the original and the first mirror again and strikes the third mirror again, the light beam reflected by the third mirror passes across an optical path between the third mirror and the fourth mirror and that between the first mirror and the second mirror and strikes the second mirror again, and the light beam reflected by the second mirror enters the imaging lens, the first mirror is disposed substantially at a middle position between the second mirror and the reading means, an on-axis light beam of the second mirror is incident on the second mirror substantially at 45°, and a light beam regulation slit is disposed on a light beam incidence side of the second mirror, and the light beam regulation slit has a shading correction function.

DETAILED DESCRIPTION OF THE PREFERRED EMBODIMENTS

Figure 1:
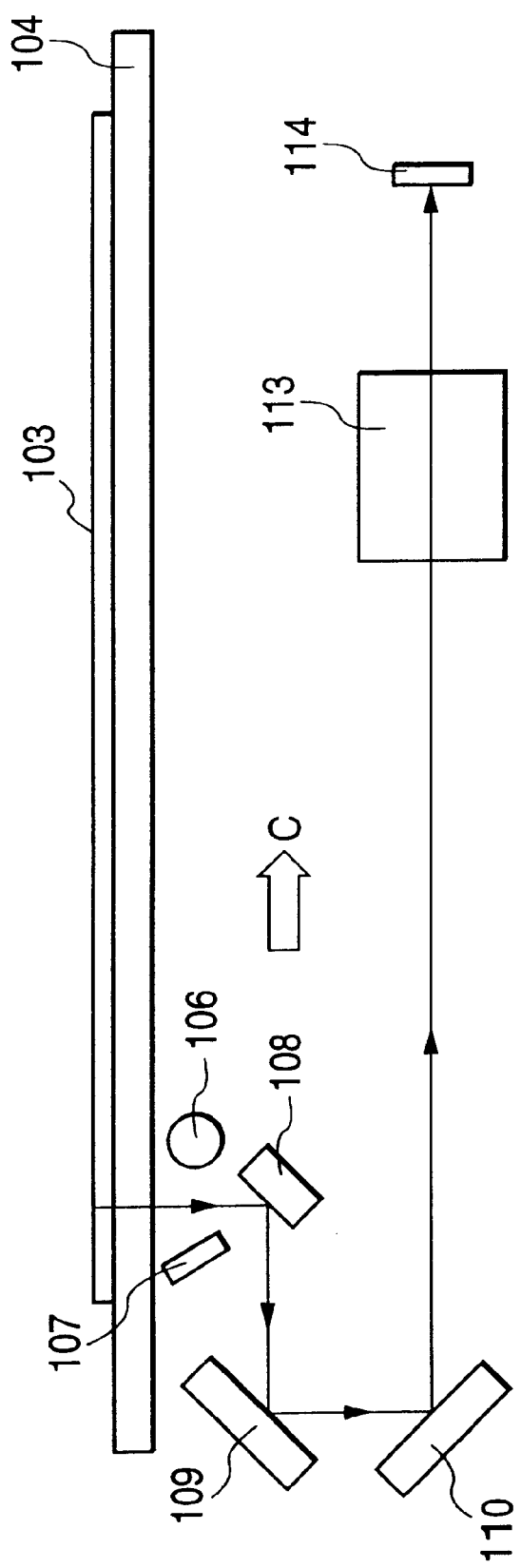
FIG. 1 is a schematic view showing the main part of a conventional image reading apparatus.
Figure 2:
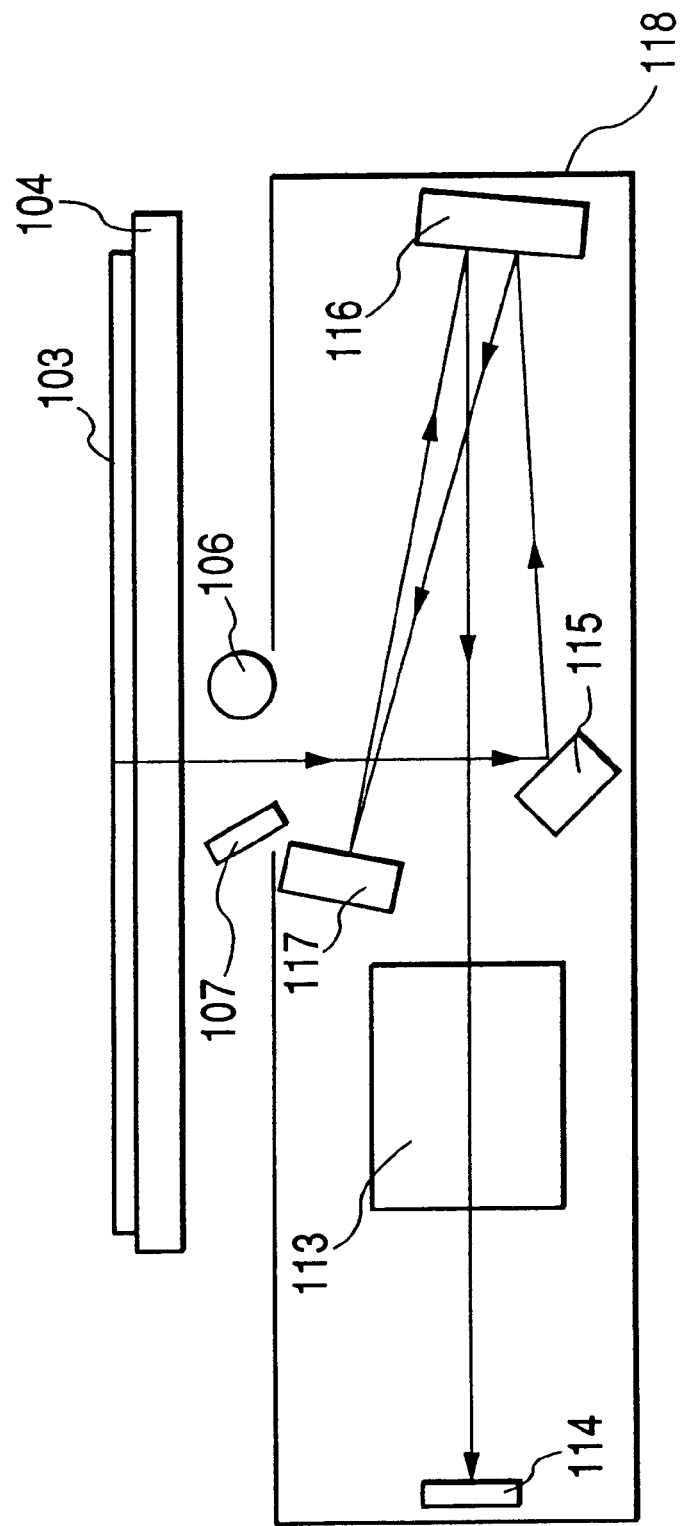
FIG. 2 is schematic view showing the main part of a conventional integrated scanning optical system unit.
Figure 3:
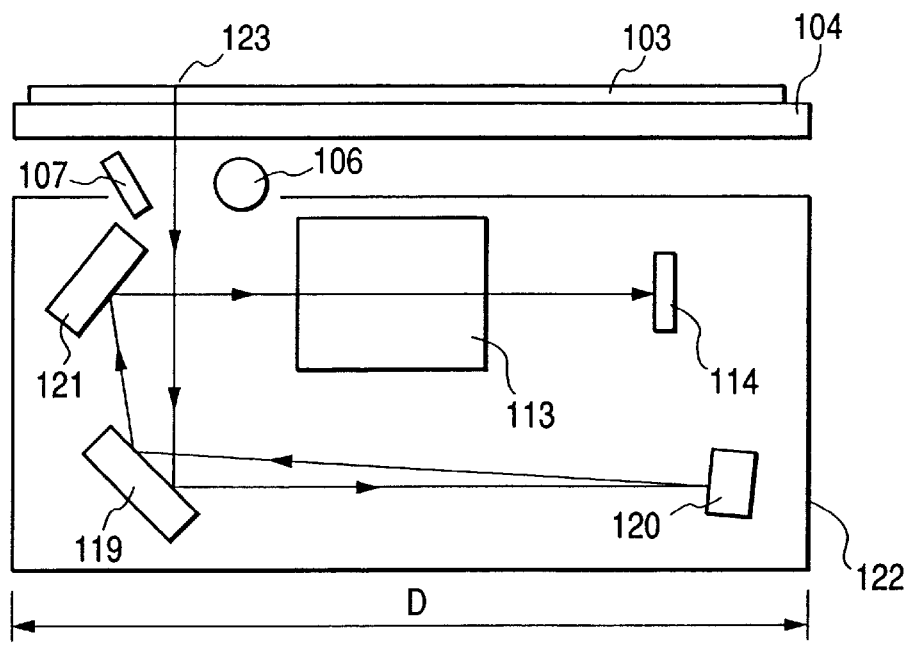
FIG. 3 is a schematic view showing the main part of another conventional integrated scanning optical system unit.
Figure 5:
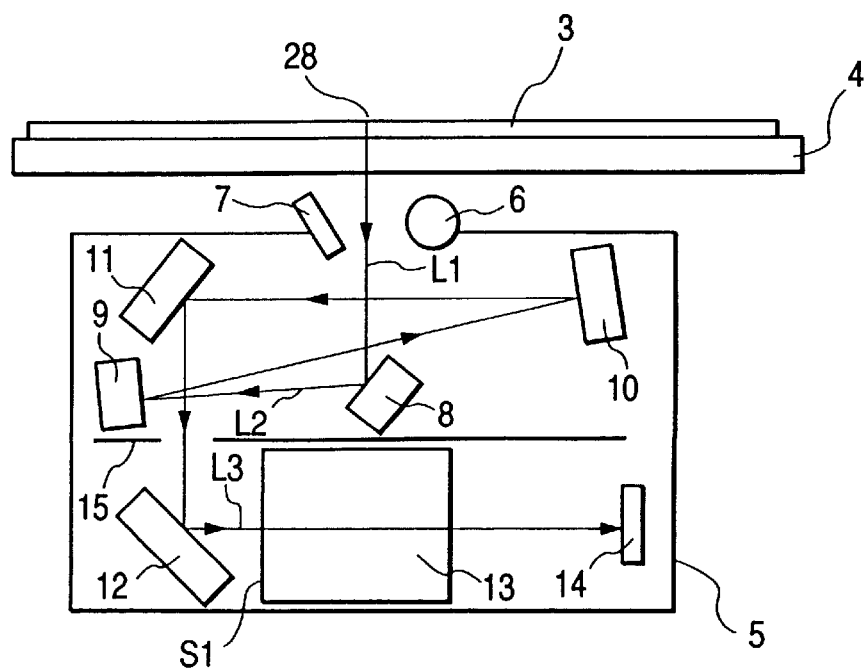
FIG. 5 is a schematic view showing the main part of an integrated scanning optical system unit shown in FIG. 4.
Figure 4:
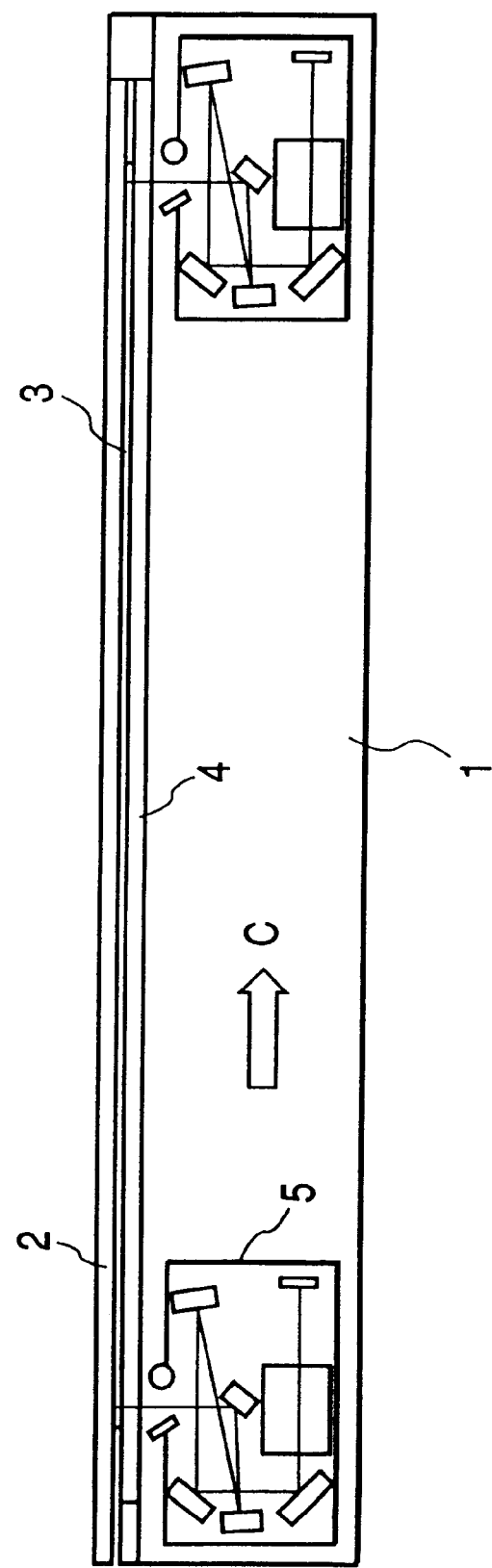
FIG. 4 is a schematic view showing the main part of an image reading apparatus according to the first embodiment of the present invention.

FIG. 4 is a schematic view showing the main part of an image reading apparatus according to the first embodiment of the present invention. FIG. 5 is a schematic view showing the main part of an integrated scanning optical system unit shown in FIG. 4.

Referring to FIGS. 4 and 5, the image reading apparatus has an image reading apparatus main body 1 and an original press plate 2 which presses an original (image) 3. The original is placed on the glass surface of an original table glass 4.

An integrated scanning optical system unit 5 integrally accommodates a light source means, reflector, a plurality of mirrors, imaging lens, and reading means (image sensor) (to be described later). The integrated scanning optical system unit 5 is scanned in the sub-scanning direction (direction indicated by an arrow C in FIG. 4) by a driving unit such as a motor (not shown) to read the image information of the original 3. The integrated scanning optical system unit will also be simply referred to as a "scanning unit" hereinafter.

A light source 6 is formed from, e.g., a fluorescent lamp or a halogen lamp. A reflector 7 reflects a light beam from the light source 6 to efficiently illuminate the original 3. The light source 6 and reflector 7 are building components of the light source means.

First, second, third, fourth, and fifth mirrors 8, 9, 10, 11, and 12 are arranged at positions to be described later to deflect the light beam from the original 3. An imaging lens 13 forms an image of the light beam, which is based on the image information of the original 3, on an image sensor 14 as a reading means. A light beam regulation slit 15 having a shading correction function is inserted on the light beam incidence side of the fifth mirror 12. To correct the light amount distribution variation on the imaging plane due to the light distribution of the illumination system or cosine fourth law of the imaging lens, the light beam regulation slit 15 has a shape for correcting, e.g., in the main scanning direction, the central light beam (lens on-axis light beam) more than the peripheral light beam (lens off-axis light beam).

In this embodiment, an optical axis (optical path) L3 connecting, of the first, second, third, fourth, and fifth mirrors 8, 9, 10, 11, and 12, the fifth mirror 12 that is optically closest to an incident surface S1 of the imaging lens 13, imaging lens 13, and image sensor 14 is substantially parallel to the surface of the original 3. In addition, the fifth mirror 12, imaging lens 13, and image sensor 14 are located at the lowest portion (lower side) of the integrated scanning optical system unit 5 with respect to the surface of the original 3 in the drawing. Of the first, second, third, fourth, and fifth mirrors 8, 9, 10, 11, and 12, the first mirror 8 which is optically closest to the surface of the original 3 is arranged in a space between the optical path L3 and the surface of the original 3 substantially at the middle position in the space between the incident surface S1 of the imaging lens 13 and the image sensor 14 along the optical axis L3 of the fifth mirror 12 and image sensor 14. That is, the first mirror 8 is disposed above the imaging lens 13 in the drawing. An on-axis light beam of the fifth mirror 12 is incident on this mirror at about 45°. The light beam regulation slit 15 is located near the fifth mirror 12.

In this embodiment, a light beam emitted from the light source 6 illuminates the lower surface of the original 3 directly or through the reflector 7. Some diffused light components from the original 3 travel downward in the vertical direction in FIG. 5 and enter the first mirror 8. The incoming light beam on the first mirror 8 is reflected to the left side of the scanning unit 5 at a predetermined angle and strikes the second mirror 9 arranged on the left end side of the scanning unit 5. The light beam incident on the second mirror 9 is reflected to the right side of the scanning unit 5 at a predetermined angle, passes across the optical path L1 between the original 3 and first mirror 8, and strikes the third mirror 10 arranged on the right end side of the scanning unit 5. The light beam incident on the third mirror 10 is reflected in the horizontal direction of the original 3, passes across the optical path L1 between the original 3 and first mirror 8 again, and strikes the fourth mirror 11 arranged on the left end side of the scanning unit 5. The light beam incident on the fourth mirror 11 is reflected to the lower side of the scanning unit 5 at a right angle, passes across an optical path L2 between the first mirror 8 and second mirror 9, and strikes the fifth mirror 12 arranged at the lowest portion of the scanning unit 5. The light beam incident on the fifth mirror 12, which is based on the image information of the original 3, is reflected in the horizontal direction of the original 3, and the image of the light beam is formed on the image sensor 14 through the imaging lens 13. When the scanning unit 5 is moved in a direction of an arrow C (sub-scanning direction) shown in FIG. 4, the image information of the original 3 is read.

In this embodiment, since the optical path L1 from the original 3 to the first mirror 8 need not cross the optical path (optical axis) L3 from the fifth mirror 12 to the image sensor 14, the distance between the fifth mirror 12 and imaging lens 13 can be decreased, so the width of the scanning unit 5 in the sub-scanning direction can be reduced.

In addition, since the first mirror 8 is inserted in the space between the optical path L3 and the surface of the original 3 and between the incident surface S1 of the imaging lens 13 and the image sensor 14, the light beam from the light source 6 can be prevented from directly entering the imaging lens 13. Hence, hazardous light such as ghost or flare can be prevented.

Since the first mirror 8 is inserted substantially at the center of the scanning unit 5, an original read position 28 is located substantially at the center of the sub-scanning-direction width of the scanning unit 5. When the original 3 is scanned from the left end to the right end, no space is required outside the read region on the right end side. Hence, the image reading apparatus can have an arrangement balanced with respect to its width in the sub-scanning direction.

Since a mirror with a large main-scanning-direction width, e.g., the first mirror 8 is arranged on the upper side of the scanning unit 5, the fifth mirror 12 arranged on the lower side can be made compact. With this arrangement, unnecessary spaces on both sides of the imaging lens 13 in the main scanning direction can be effectively used.

The angle of incidence of the on-axis light beam on the fifth mirror 12 is about 45°, and the light beam regulation slit 15 is disposed on the light beam incident side of the fifth mirror 12. With this arrangement, only light components that are to contribute to image formation can be sent to become incident on the imaging lens 13, and hazardous light such as ghost or flare can be further suppressed.

Since the light beam regulation slit 15 has a shading correction function, the light amount distribution variation due to the light distribution of the illumination system or cosine fourth law of the lens can be easily corrected, and a shading correction plate, which is conventionally required, can be omitted.

In the first embodiment, five scanning mirrors are arranged at appropriate positions. For this reason, the entire apparatus size can be reduced even in use of an integrated scanning optical system unit using an optical system whose optical path length from the original to the imaging lens is relatively large, i.e., whose reduction magnification is relatively small, and a simple arrangement (low cost) can be realized.

Figure 6:
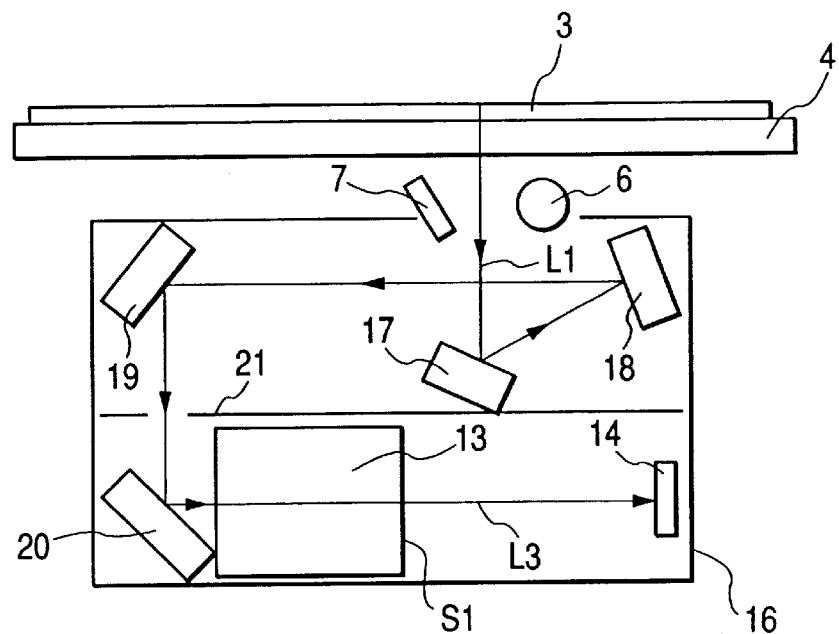
FIG. 6 is a schematic view showing the main part of an integrated scanning optical system unit according to the second embodiment of the present invention.

FIG. 6 is a schematic view showing the main part of the second embodiment of the present invention. The same reference numerals as in FIG. 5 denote the same elements in FIG. 6.

In the second embodiment, a plurality of scanning mirrors comprise first, second, third, and fourth mirrors 17, 18, 19, and 20. An optical axis L3 connecting, of the first, second, third, and fourth mirrors 17, 18, 19, and 20, the fourth mirror 20 that is optically closest to an incident surface S1 of an imaging lens 13, imaging lens 13, and image sensor 14 is substantially parallel to the surface of an original 3. In addition, the fourth mirror 20, imaging lens 13, and image sensor 14 are located at the lowest position (lower side) of an integrated scanning optical system unit 16 with respect to the surface of the original 3 in the drawing. Of the first, second, third, and fourth mirrors 17, 18, 19, and 20, the first mirror 17 optically closest to the original 3 is inserted between the optical axis L3 and the original 3 substantially at the middle position in the space between the incident surface S1 of the imaging lens 13 and the image sensor 14 along the optical axis L3 of the fourth mirror 20 and image sensor 14. An on-axis light beam of the fourth mirror 20 is incident on this mirror at about 45°. A light beam regulation slit 21 is disposed near the fourth mirror 20.

In this embodiment, a light beam emitted from a light source 6 illuminates the lower surface of the original 3 directly or through a reflector 7. Some diffused light components from the original 3 travel downward in the vertical direction in FIG. 6 and hit the first mirror 17. The light beam incident on the first mirror 17 is reflected to the right side of the scanning unit 16 at a predetermined angle and strikes the second mirror 18 arranged at the right end of the scanning unit 16. The light beam incident on the second mirror 18 is reflected in the horizontal direction of the original 3, passes across an optical path L1 between the original 3 and first mirror 17, and strikes the third mirror 19 arranged at the left end of the scanning unit 16. The light beam incident on the third mirror 19 is reflected to the lower side of the scanning unit 16 at a right angle and enters the fourth mirror 20 arranged at the lowest position of the scanning unit 16. The light beam incident on the fourth mirror 20, which is based on the image information of the original, is reflected in the horizontal direction of the original 3, and the image of the light beam is formed on the image sensor 14 through the imaging lens 13. When the scanning unit 16 is moved in the sub-scanning direction, the image information of the original 3 is read.

In this embodiment, four scanning mirrors are set at appropriate positions, as described above. With this arrangement, the same effect as in the first embodiment can be obtained. The entire apparatus size can be reduced even in use of an integrated scanning optical system unit using an optical system whose optical path length from the original to the imaging lens is relatively short, i.e., whose reduction magnification is relatively large, and a simple arrangement (low cost) can be realized.

Figure 7:
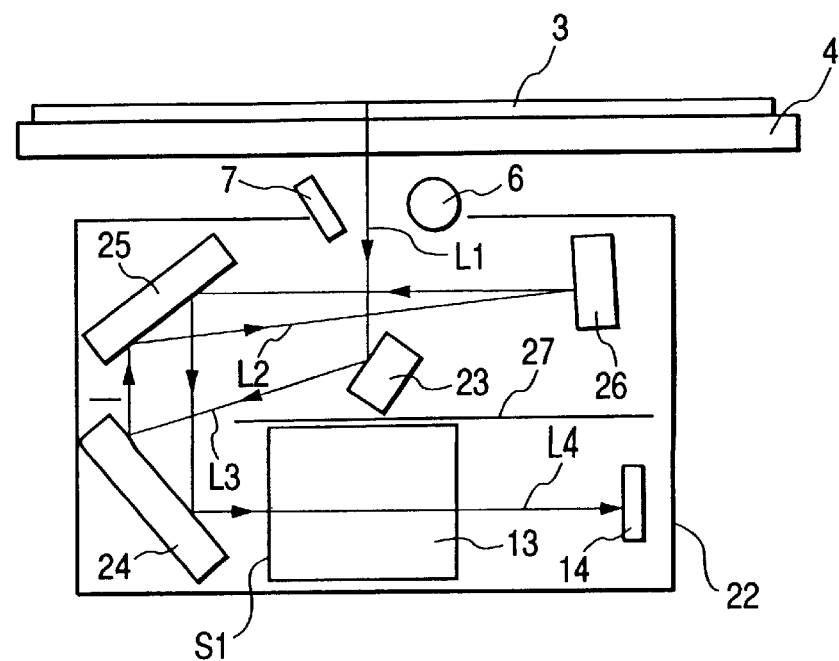
FIG. 7 is a schematic view showing the main part of an integrated scanning optical system unit according to the third embodiment of the present invention.

FIG. 7 is a schematic view showing the main part of the third embodiment of the present invention. The same reference numerals as in FIG. 5 denote the same elements in FIG. 7.

In the third embodiment, a plurality of scanning mirrors comprise first, second, third, and fourth mirrors 23, 24, 25, and 26. An optical axis L4 connecting, of the first, second, third, and fourth mirrors 23, 24, 25, and 26, the second mirror 24 that is optically closest to an incident surface Si of an imaging lens 13, imaging lens 13, and image sensor 14 is substantially parallel to the surface of an original 3. In addition, the second mirror 24, imaging lens 13, and image sensor 14 are located at the lowest position (lower side) of an integrated scanning optical system unit 22 with respect to the surface of the original 3 in the drawing. Of the first, second, third., and fourth mirrors 23, 24, 25, and 26, the first mirror 23 optically closest to the original 3 is inserted between the optical axis L4 and the original 3 substantially at the middle position in the space between the incident surface SI of the imaging lens 13 and the image sensor 14 along the optical axis L4 of the second mirror 24 and image sensor 14. An on-axis light beam of the second mirror 24 is incident on this mirror at about 45°. A light beam regulation slit 27 is disposed near the second mirror 24.

In this embodiment, a light beam emitted from a light source 6 illuminates the lower surface of the original 3 directly or through a reflector 7. Some diffused light components from the original 3 travel downward in the vertical direction in FIG. 7, are reflected by the first mirror 23 to the left side of the scanning unit 22, and strike the second mirror 24 arranged at the left end of the scanning unit 22. The light beam incident on the second mirror 24 is reflected to the upper side of the scanning unit 22 at a predetermined angle and reaches the third mirror 25 arranged at the left end of the scanning unit 22. The light beam incident on the third mirror 25 is reflected to the right side of the scanning unit 22 at a predetermined angle, passes across an optical path L1 between the original 3 and first mirror 23, and arrives at the fourth mirror 26 arranged at the right end of the scanning unit 22. The light beam incident on the fourth mirror 26 is reflected in the horizontal direction of the original 3, passes across the optical path L1 between the original 3 and first mirror 23 again, and strikes the third mirror 25 again. The light beam incident on the third mirror 25 is reflected to the lower side of the scanning unit 22 at a right angle, passes across an optical path L2 between the third mirror 25 and fourth mirror 26 and the optical path L3 between the first mirror 23 and second mirror 24, and strikes the second mirror 24 again. The light beam incident on the second mirror 24, which is based on the image information of the original, is reflected in the horizontal direction of the original 3, and the image of the light beam is formed on the image sensor 14 through the imaging lens 13. When the scanning unit 22 is moved in the sub-scanning direction, the image information of the original 3 is read.

According to the third embodiment, the same effect as in the first and second embodiments can be obtained by using multiple reflection of two of the four scanning mirrors. The entire apparatus size can be reduced even in use of an integrated scanning optical system unit using an optical system whose optical path length from the original to the lens is relatively long, although the number of mirrors is small, and a simple arrangement (low cost) can be realized.

As long as the elements of the present invention are satisfied, the present invention can be applied to an integrated scanning optical system unit having any arrangement other than those of the above-described embodiments.

According to the present invention, an optical axis L connecting, of a plurality of mirrors, a mirror B optically closest to the incident surface of the imaging lens, imaging lens, and reading means is substantially parallel to the original surface. In addition, the mirror B, imaging lens, and reading means are located at the lowest position of the integrated scanning optical system unit with respect to the original surface. Furthermore, of the plurality of mirrors, a mirror A optically closest to the original surface is inserted between the optical axis L and original surface in the space between the incident surface of the imaging lens and the reading means. With this arrangement, an image reading apparatus capable of suppressing hazardous light such as ghost or flare and reducing the size of the integrated scanning optical system unit can be realized.

What is claimed is:

1. An image reading apparatus comprising:
   a light source adapted to illuminate an original;
   a plurality of mirrors for reflecting a light beam from the original illuminated with said light source;
   an imaging lens for forming an image of the light beam reflected by said plurality of mirrors;
   a reading unit arranged at an image forming position of said imaging lens; and
   an integrated scanning optical unit movable in a scanning direction, said integrated scanning optical unit integrally accommodating said light source, said plurality of mirrors, said imaging lens, and said reading unit, thereby obtaining image information of the original,
   wherein an optical axis L connecting, of said plurality of mirrors, a mirror B optically closest to an incident surface of said imaging lens, said imaging lens, and said reading unit is substantially parallel to the original surface, said mirror B, said imaging lens, and said reading unit are located at a lowest position of said integrated scanning optical system unit with respect to the original surface, and of said plurality of mirrors, a mirror A optically closest to the original surface is disposed in a space between the optical axis L and the original surface and between the incident surface of said imaging lens and said reading unit,
   wherein said mirror A is disposed substantially at a middle position between said mirror B and said reading unit, an on-axis light beam of said mirror B is incident on said mirror B substantially at 45°, and a light beam regulation slit is disposed on a light beam incidence side of said mirror B.

2. An apparatus according to claim 1, wherein the light beam regulation slit has a shading correction function.

3. An image reading apparatus comprising:
   a light source that illuminates an original;
   a plurality of mirrors for reflecting a light beam from the original illuminated with said light source;
   an imaging lens for forming an image of the light beam reflected by said plurality of mirrors;
   a reading unit arranged at an image forming position of said imaging lens; and
   an integrated scanning optical unit movable in a scanning direction, said integrated scanning optical unit integrally accommodating said light source, said plurality of mirrors, said imaging lens, and said reading unit, thereby obtaining image information of the original,
   wherein an optical axis L connecting, of said plurality of mirrors, a mirror B optically closest to an incident surface of said imaging lens, said imaging lens, and said reading unit is substantially parallel to the original surface, said mirror B, said imaging lens, and said reading unit are located at a lowest position of said integrated scanning optical system unit with respect to the original surface, and of said plurality of mirrors, a mirror A optically closest to the original surface is disposed in a space between the optical axis L and the original surface and between the incident surface of said imaging lens and said reading unit,
   wherein said plurality of mirrors comprise first, second, third, fourth, and fifth mirrors and have an arrangement with which the light beam from the original is reflected by said first mirror and strikes said second mirror, the light beam reflected by said second mirror passes across an optical path between the original and said first mirror and strikes said third mirror, the light beam reflected by said third mirror passes across the optical path between the original and said first mirror again and strikes said fourth mirror, the light beam reflected by said fourth mirror passes across an optical path between said first mirror and said second mirror and strikes said fifth mirror, and the light beam reflected by said fifth mirror enters said imaging lens.

4. An apparatus according to claim 3, wherein said first mirror is disposed substantially at a middle position between said fifth mirror and said reading unit, a light beam on an axis of said fifth mirror is incident on said fifth mirror substantially at 45°, and a light beam regulation slit is inserted on a light beam incidence side of said fifth mirror.

5. An apparatus according to claim 4, wherein the light beam regulation slit has a shading correction function.

6. An image reading apparatus comprising:

a light source that illuminates an original;

a plurality of mirrors for reflecting a light beam from the original illuminated with said light source;

an imaging lens for forming an image of the light beam reflected by said plurality of mirrors;

a reading unit arranged at an image forming position of said imaging lens; and an integrated scanning optical unit movable in a scanning direction, said integrated scanning optical unit integrally accommodating said light source means, said plurality of mirrors, said imaging lens, and said reading means, thereby obtaining image information of the original, wherein an optical axis L connecting, of said plurality of mirrors, a mirror B optically closest to an incident surface of said imaging lens, said imaging lens, and said reading unit is substantially parallel to the original surface, said mirror B, said imaging lens, and said reading unit are located at a lowest position of said integrated scanning optical system unit with respect to the original surface, and of said plurality of mirrors, a mirror A optically closest to the original surface is disposed in a space between the optical axis L and the original surface and between the incident surface of said imaging lens and said reading unit, wherein said plurality of mirrors comprise first, second, third, and fourth mirrors and have an arrangement with which the light beam from the original is reflected by said first mirror and strikes said second mirror, the light beam reflected by said second mirror passes across an optical path between the original and said first mirror and strikes said third mirror, the light beam reflected by said third mirror strikes said fourth mirror, and the light beam reflected by said fourth mirror enters said imaging lens.

7. An apparatus according to claim 6, wherein said first mirror is disposed substantially at a middle position between said fourth mirror and said reading unit, an on-axis light beam of said fourth mirror is incident on said fourth mirror substantially at 45°, and a light beam regulation slit is disposed at a light beam incidence side of said fourth mirror.

8. An apparatus according to claim 7, wherein the light beam regulation slit has a shading correction function.

9. An image reading apparatus comprising:

a light source that illuminates an original;

a plurality of mirrors for reflecting a light beam from the original illuminated with said light source;

an imaging lens for forming an image of the light beam reflected by said plurality of mirrors;

a reading unit arranged at an image forming position of said imaging lens; and an integrated scanning optical unit movable in a scanning direction, said integrated scanning optical unit integrally accommodating said light source, said plurality of mirrors, said imaging lens, and said reading unit, thereby obtaining image information of the original, wherein an optical axis L connecting, of said plurality of mirrors, a mirror B optically closest to an incident surface of said imaging lens, said imaging lens, and said reading unit is substantially parallel to the original surface, said mirror B, said imaging lens, and said reading unit are located at a lowest position of said integrated scanning optical system unit with respect to the original surface, and of said plurality of mirrors, a mirror A optically closest to the original surface is disposed in a space between the optical axis L and the original surface and between the incident surface of said imaging lens and said reading unit, wherein said plurality of mirrors comprise first, second, third, and fourth mirrors and have an arrangement with which the light beam from the original is reflected by said first mirror and strikes said second mirror, the light beam reflected by said second mirror strikes said third mirror, the light beam reflected by said third mirror passes across an optical path between the original and said first mirror and strikes said fourth mirror, the light beam reflected by said fourth mirror passes across the optical path between the original and said first mirror again and strikes said third mirror again, the light beam reflected by said third mirror passes across an optical path between said third mirror and said fourth mirror and that between said first mirror and said second mirror and strikes said second mirror again, and the light beam reflected by said second mirror enters said imaging lens.

10. An apparatus according to claim 9, wherein said first mirror is disposed substantially at a middle position between said second mirror and said reading unit, an on-axis light beam of said second mirror is last incident on said second mirror substantially at 45°, and a light beam regulation slit is disposed on a light beam incidence side of said second mirror.

11. An apparatus according to claim 10, wherein the light beam regulation slit has a shading correction function.

* * * * *

UNITED STATES PATENT AND TRADEMARK OFFICE
CERTIFICATE OF CORRECTION

PATENT NO. : 6,172,784 B1
DATED : January 9, 2001
INVENTOR(S) : Kazuyuki Kondo

It is certified that error appears in the above-identified patent and that said Letters Patent is hereby corrected as shown below:

<u>Title page,</u>
Item [75], Inventor: "KAZUYUKI KONDA" should read -- KAZUYUKI KONDO --.

Signed and Sealed this

Sixteenth Day of April, 2002

Attest:

JAMES E. ROGAN
*Attesting Officer*     *Director of the United States Patent and Trademark Office*